US005729781A

United States Patent [19]

Warren

[11] Patent Number: 5,729,781
[45] Date of Patent: Mar. 17, 1998

[54] FOLDING STEREOSCOPIC CAMERA

[76] Inventor: Barry L. Warren, 13378 Kay Dr., Corona, Calif. 91719

[21] Appl. No.: 734,495

[22] Filed: Oct. 21, 1996

[51] Int. Cl.⁶ .................................................. G03B 35/08
[52] U.S. Cl. ........................................................... 396/325
[58] Field of Search ..................................... 396/322, 324, 396/325, 329, 333; 359/466, 473, 474, 475, 477

[56] References Cited

U.S. PATENT DOCUMENTS 2,690,698 10/1954 Dasch ....................................... 359/474
3,045,573 7/1962 Wanner ..................................... 396/325

*Primary Examiner*—Howard B. Blankenship

[57] ABSTRACT

A folding stereoscopic camera and viewer including a pair of cameras hingedly coupled at inner lower edges thereof. Each camera has a centrally disposed lens. One of the cameras has a shutter release button disposed on an upper surface thereof. The shutter release button synchronizes the release of a shutter of each of the pair of cameras. The pair of cameras each contain film therein whereupon taking of a picture will produce a pair of developable slides.

1 Claim, 3 Drawing Sheets

FOLDING STEREOSCOPIC CAMERA

BACKGROUND OF THE INVENTION

1. Field of the Invention

The present invention relates to a folding stereoscopic camera and viewer and more particularly pertains to allowing photographs to be taken in portrait and landscape orientation with a folding stereoscopic camera and viewer.

2. Description of the Prior Art

The use of stereoscopic cameras is known in the prior art. More specifically, stereoscopic cameras heretofore devised and utilized for the purpose of taking stereoscopic pictures are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,725,863 to Dumbreck et al. discloses a stereo camera.

U.S. Pat. No. 4,768,049 to Barrett et al. discloses a stereoscopic camera slide bar.

U.S. Pat. No. 3,959,804 to Rochwite discloses a stereoscopic camera.

U.S. Pat. No. 5,065,236 to Diner discloses stereoscopic camera and viewing systems with undistorted depth presentation and reduced or eliminated erroneous acceleration and deceleration perceptions, or with perceptions produced or enhanced for special effects.

U.S. Pat. No. 4,879,596 to Miura et al. discloses a stereoscopic camera apparatus which incorporates cameras and can commonly adjust directions of the cameras.

U.S. Pat. No. Des. 329,864 to Kawagoe discloses the ornamental design for a camera.

While these devices fulfill their respective, particular objective and requirements, the aforementioned patents do not describe a folding stereoscopic camera and viewer for allowing photographs to be taken in portrait and landscape orientation.

In this respect, the folding stereoscopic camera and viewer according to the present invention substantially departs from the conventional concepts and designs of the prior art, and in doing so provides an apparatus primarily developed for the purpose of allowing photographs to be taken in portrait and landscape orientation.

Therefore, it can be appreciated that there exists a continuing need for new and improved folding stereoscopic camera and viewer which can be used for allowing photographs to be taken in portrait and landscape orientation. In this regard, the present invention substantially fulfills this need.

SUMMARY OF THE INVENTION

In the view of the foregoing disadvantages inherent in the known types of stereoscopic cameras now present in the prior art, the present invention provides an improved folding stereoscopic camera and viewer. As such, the general purpose of the present invention, which will be described subsequently in greater detail, is to provide a new and improved folding stereoscopic camera and viewer and method which has all the advantages of the prior art and none of the disadvantages.

To attain this, the present invention essentially comprises a pair of cameras hingedly coupled at inner lower edges thereof. Each camera has a centrally disposed lens. One of the cameras has a shutter release button disposed on an upper surface thereof. The shutter release button synchronizes the release of a shutter of each of the pair of cameras. The pair of cameras each contain film therein whereupon taking of a picture will produce a pair of developable slides. The device includes a flexible slide holder comprising an elongated member having a receiving channel formed therein. The receiving channel is dimensioned for receiving an upper edge of the pair of slides therein. The elongated member has a tab extending upwardly from an upper surface thereof. The device includes a slide viewer comprising a pair of individual viewers rotatably coupled together at inner side walls thereof. An elongated slot extends through a top wall of the coupled together pair of individual viewers. The elongated slot receives the flexible slide holder with attached slides therein for viewing through the slide viewer.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved folding stereoscopic camera and viewer which has all the advantages of the prior art stereoscopic cameras and none of the disadvantages.

It is another object of the present invention to provide a new and improved folding stereoscopic camera and viewer which may be easily and efficiently manufactured and marketed.

It is a further object of the present invention to provide a new and improved folding stereoscopic camera and viewer which is of durable and reliable construction.

An even further object of the present invention is to provide a new and improved folding stereoscopic camera and viewer which is susceptible of a low cost of manufacture with regard to both materials and labor, and which accordingly is then susceptible of low prices of sale to the consuming public, thereby making such a folding stereoscopic camera and viewer economically available to the buying public.

Even still another object of the present invention is to provide a new and improved folding stereoscopic camera and viewer for allowing photographs to be taken in portrait and landscape orientation.

Lastly, it is an object of the present invention to provide a new and improved folding stereoscopic camera and viewer including a pair of cameras hingedly coupled at inner lower edges thereof. Each camera has a centrally disposed lens. One of the cameras has a shutter release button disposed on an upper surface thereof. The shutter release button synchronizes the release of a shutter of each of the pair of cameras. The pair of cameras each contain film therein whereupon taking of a picture will produce a pair of developable slides.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
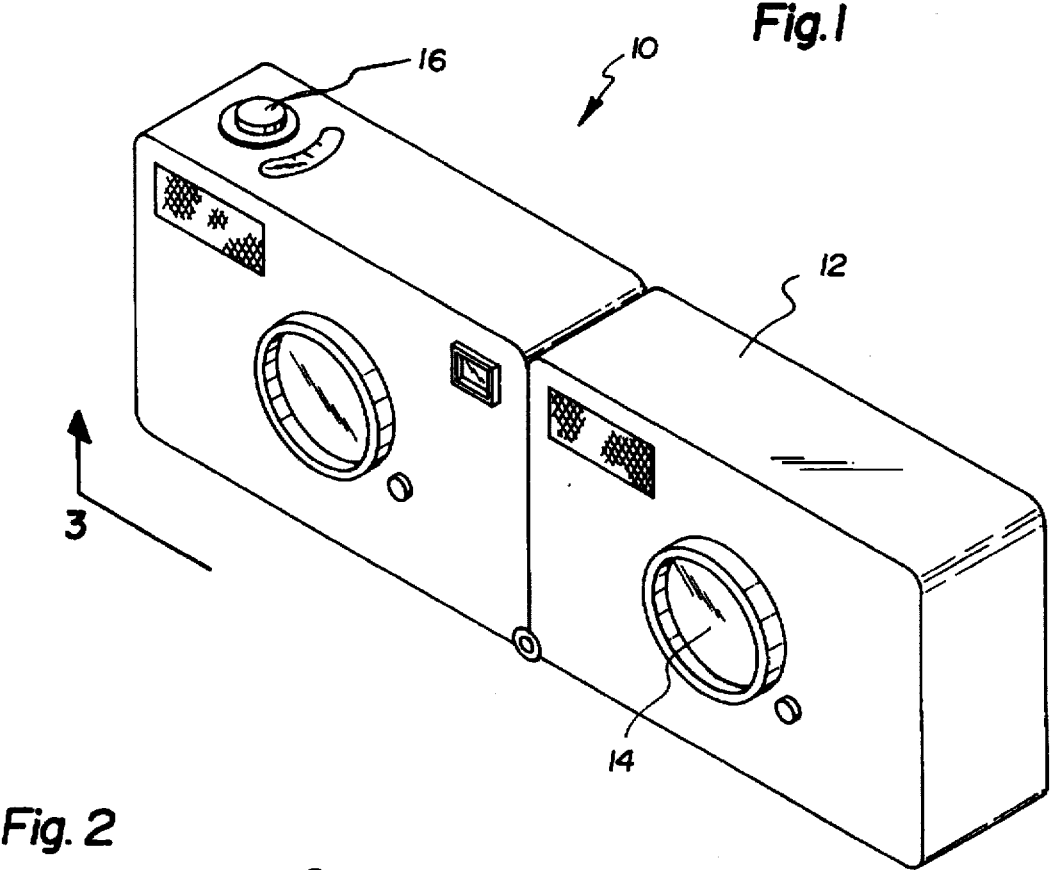
FIG. 1 is a perspective view of the preferred embodiment of the folding stereoscopic camera and viewer constructed in accordance with the principles of the present invention.
Figure 2:
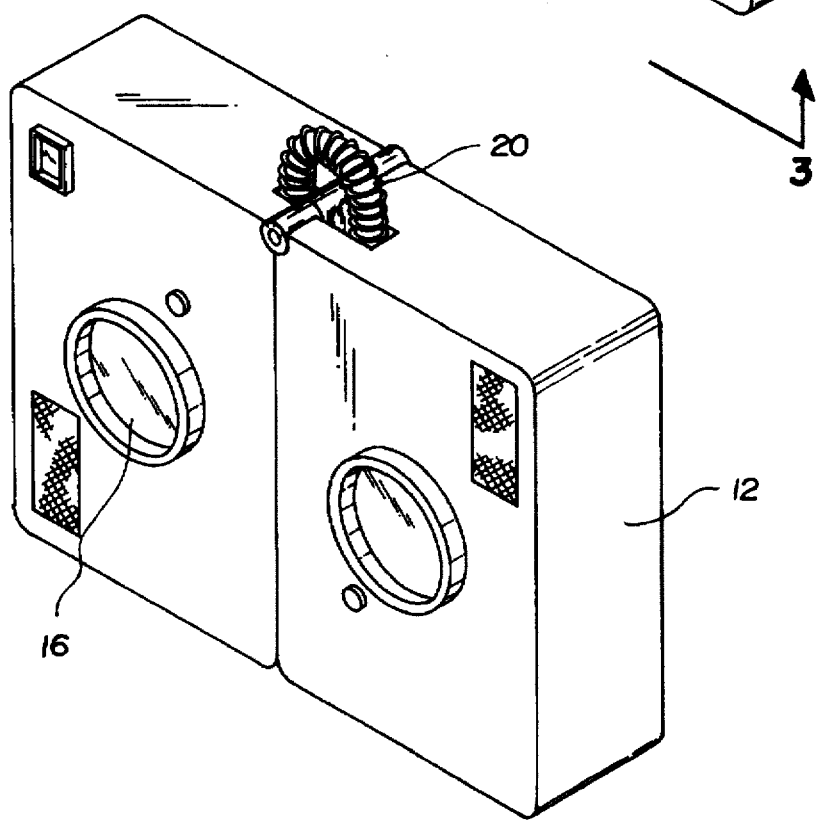
FIG. 2 is a perspective view of the stereoscopic camera of the present invention in a folded orientation.
Figure 3:
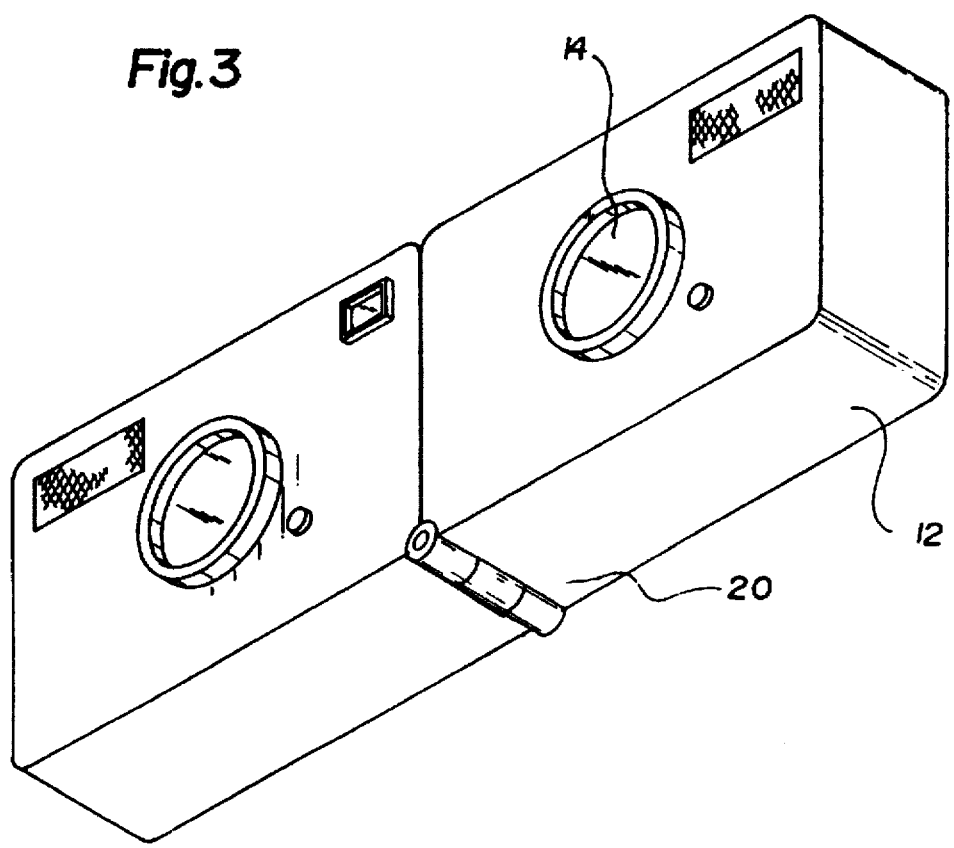
FIG. 3 is a bottom perspective view of the stereoscopic camera as taken along line 3—3 of FIG. 1.
Figure 4:
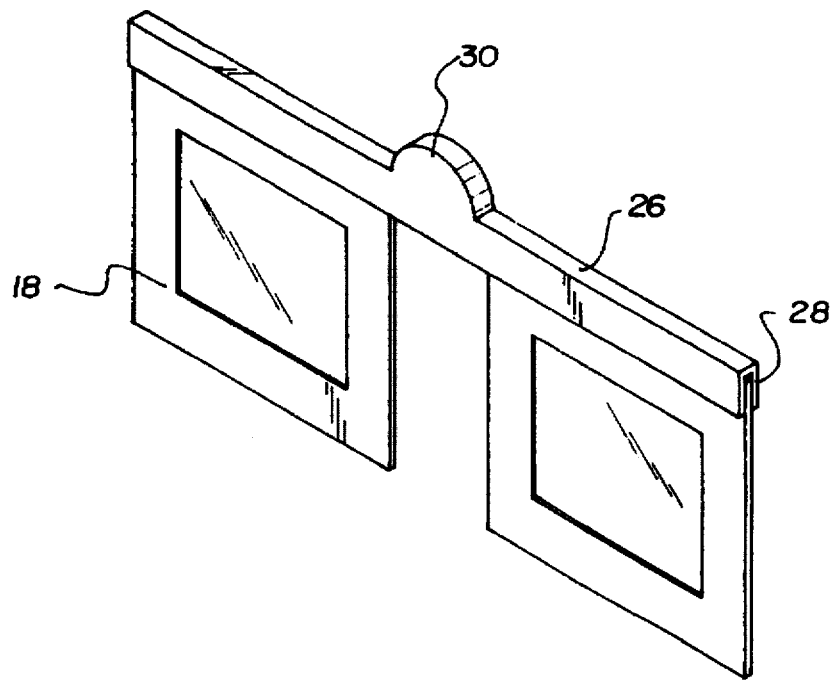
FIG. 4 is a perspective view of the slide holder of the present invention.
Figure 5:
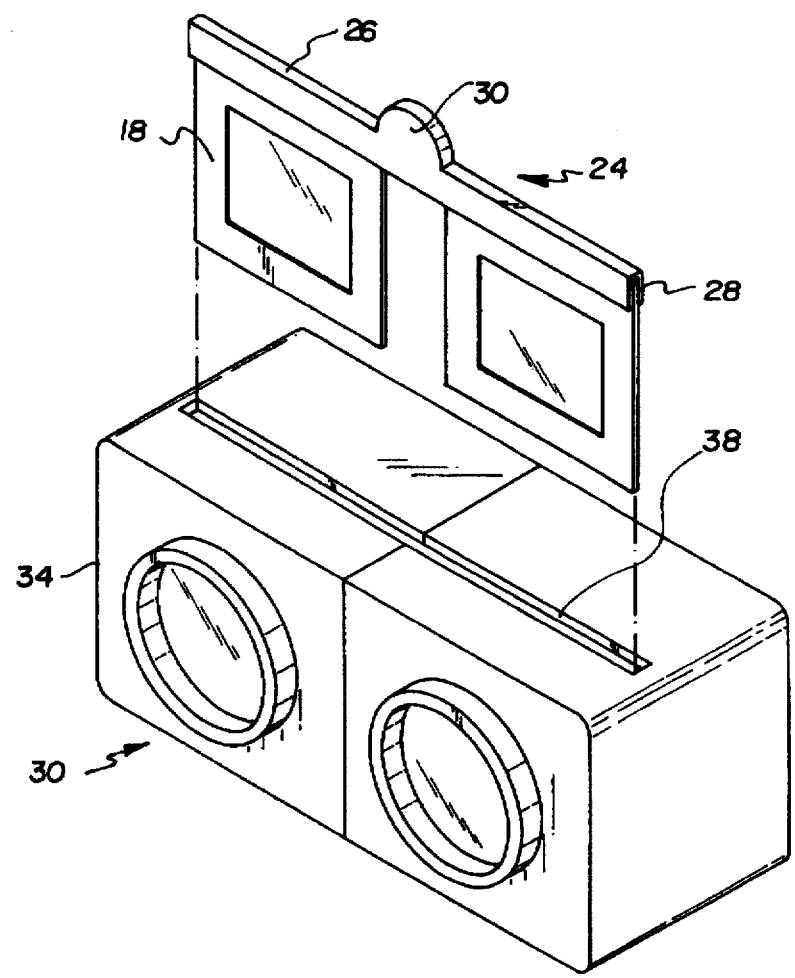
FIG. 5 is a front perspective view of the viewer of the present invention.
Figure 6:
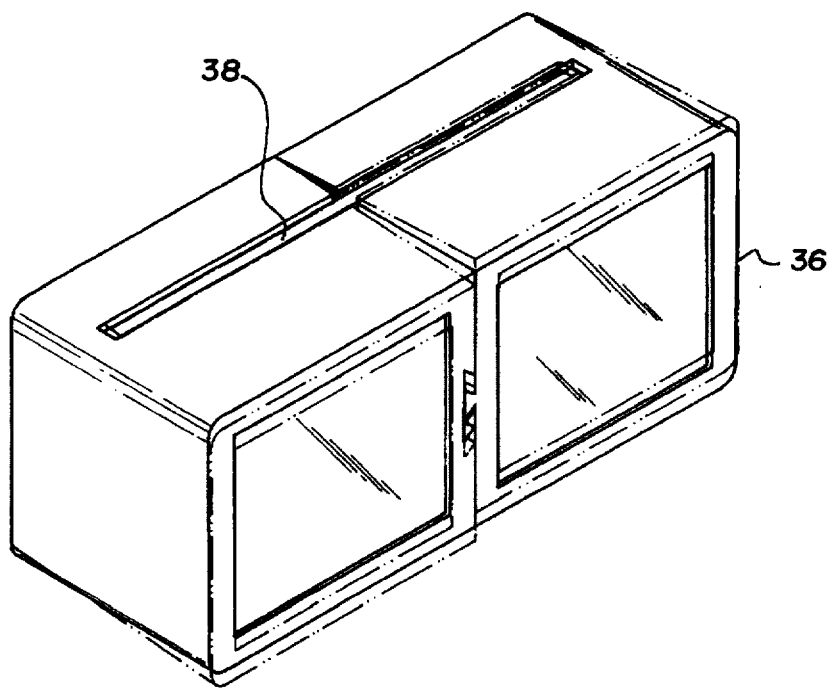
FIG. 6 is a rear perspective view of the viewer of the present invention.

With reference now to the drawings, and in particular, to FIGS. 1–6 thereof, the preferred embodiment of the new and improved folding stereoscopic camera and viewer embodying the principles and concepts of the present invention and generally designated by the reference number 10 will be described.

Specifically, it will be noted in the various Figures that the device relates to a folding stereoscopic camera and viewer for allowing photographs to be taken in portrait and landscape orientation. In its broadest context, the device consists of a pair of cameras, a slide holder and a viewer. Such components are individually configured and correlated with respect to each other so as to attain the desired objective.

The device 10 includes a pair of cameras 12 hingedly coupled at inner lower edges thereof. Each camera 12 has a centrally disposed lens 14. One of the cameras 12 has a shutter release button 16 disposed on an upper surface thereof. The shutter release button 16 synchronizes the release of a shutter of each of the pair of cameras 12. The pair of cameras 12 each contain film therein whereupon taking of a picture will produce a pair of developable slides 18. The hinged coupling of the pair of cameras 12 is made through the use of a hinge 20 between the pair of cameras 12. This allows a user to change the longitudinal orientation of the photograph form a vertical to a horizontal plane. The focusing and exposure settings of the pair of cameras 12 will be fully automatic.

The device 10 includes a flexible slide holder 24 comprising an elongated member 26 having a receiving channel 28 formed therein. The receiving channel 28 is dimensioned for receiving an upper edge of the pair of slides 18 therein. The elongated member 26 has a tab 30 extending upwardly from an upper surface thereof. After the film is developed into the side 18, the slide 18 is then inserted into the receiving channel 28. The tab 30 allows for easy handling of the slides 18 without having to directly handle the slides 18.

The device 10 also includes a slide viewer 34 comprising a pair of individual viewers 36 rotatably coupled together at inner side walls thereof. An elongated slot 38 extends through a top wall of the coupled together pair of individual viewers 36. The elongated slot 38 receives the flexible slide holder 24 with attached slides 18 therein for viewing through the slide viewer 34. The tab 30 will extend outwardly of the slide viewer 34 to allow for easy handling of the slides 18. The rotatability of the slide viewer 34 allows for the adjustment of the pair of individual viewers 36 to properly merge the slides 18.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A folding camera for allowing photographs to be taken in portrait and landscape orientation comprising, in combination:

a pair of cameras, each camera being formed in a generally rectilinear configuration with parallel rectangular short edge faces and with parallel rectangular long edge faces, each camera having a centrally disposed lens with central parallel axes, a shutter release button synchronizing the release of a shutter of each of the pair of cameras, the pair of cameras each containing film therein whereupon taking of a picture will produce a pair of developable slides and a hinge at the junction of a short edge face and a long edge face, the hinge having an axis of rotation parallel with the axes of the lenses for rotating the cameras between a first orientation wherein short edge faces of the two cameras are in contact for taking a landscape type picture and a second orientation wherein long edge faces of the two cameras are in contact for taking a portrait type picture.

\* \* \* \* \*